Oct. 4, 1932. J. A. H. SIERS Re. 18,612

FASTENING DEVICE

Original Filed July 22, 1931

INVENTOR
John A. H. Siers
BY C. P. Sedgwick
his ATTORNEY

Reissued Oct. 4, 1932

Re. 18,612

UNITED STATES PATENT OFFICE

JOHN A. H. SIERS, OF JERSEY CITY, NEW JERSEY

FASTENING DEVICE

Original No. 1,859,751, dated May 24, 1932, Serial No. 552,314, filed July 22, 1931. Application for reissue filed June 30, 1932. Serial No. 620,211.

This invention relates to fastening devices for application to garments, luggage, containers and other analogous articles, and more particularly to devices of that general character which comprise two series of successively interlocking members adapted to be connected together or separated by means of an operating member slidably coacting with the individual members or elements of each series.

It is one of the objects of the present invention to provide a fastener of this type of simple and inexpensive construction and which may be readily applied to overlapping portions of the article which serve to flexibly connect the individual elements of each series with each other, said elements being so constructed and arranged, that when the fastener is closed, the interlocked series of elements together with the operating member therefor, are substantially wholly concealed by the overlapping portions of the article, so that the device will not objectionably affect the neat and attractive appearance of the latter.

It is another object of my invention to provide individual locking elements of novel and simple form having means with which the operating member will coact in a positive and reliable manner to interlock or disconnect the opposing elements, and which will also coact with each other when in interlocked relation to positively prevent relative angular movement between either the adjacent members in the same series, or the interlocked members in the opposing series.

For a detailed description of one form of my invention which I at present deem preferable, reference may be had to the following specification and to the accompanying drawing forming a part thereof, in which Figure 1 is a plan view of my improved separable fastener showing certain of the elements in the opposing series in interlocked relation and others separated from each other;

Figure 1:
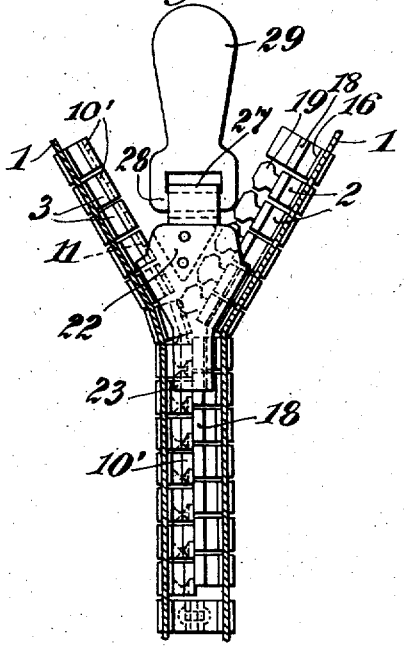

In the drawing, for clarity in illustration, I have shown the parts of my improved separable fastener on a greatly enlarged scale whereby the details thereof may be readily understood.

Figure 5:
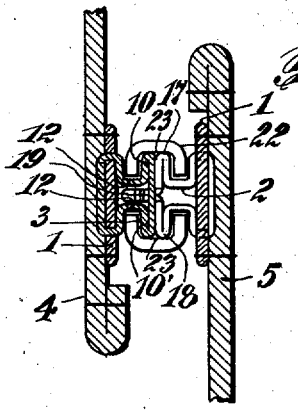
Fig. 5 is a transverse sectional view taken substantially on the line 5—5 of Fig. 2.
Figure 6:
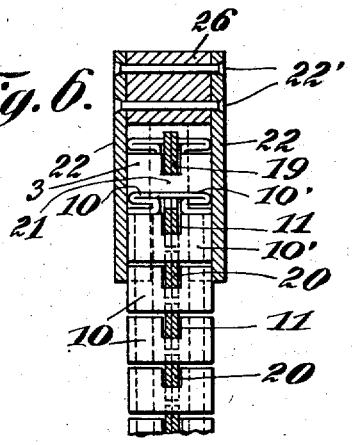
Fig. 6 is a sectional view taken on the line 6—6 of Fig. 2.

Referring more specifically to the drawing, the overlapping parts of the article, such as strips of fabric or other similar material, preferably in the form of tapes attachable to the article, are indicated at 1. To the opposing sides of these fabric strips or tapes, the two series of locking elements designated 2 and 3 are respectively fastened or secured. As indicated in Fig. 5 of the drawing, the flexible tapes may be stitched at their opposite longitudinal edges to the overlapping edge portions 4 and 5 respectively of the garment or other article. This particular application of the tapes carrying the two series of fastener elements is of course merely suggestive, as the device might also be otherwise applied in its application and use in connection with other commercial articles.

Figure 3:
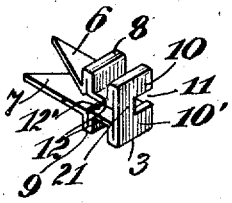
Fig. 3 is a detailed perspective view of one of the female elements of the fastener.

Referring now more particularly to Fig. 3 of the drawing, the female fastener element is therein illustrated as preferably formed from a sheet metal strip terminating in the prongs 6 and 7 which are adapted to penetrate the tape 1 from one side thereof and be tightly clinched upon the opposite side of the tape. At the inner ends of these prongs, the metal strip is doubled or folded on itself to provide the spaced projections or bases 8 and 9 for direct contact against one side of the tape 1. The central portion of the metal strip is likewise folded upon itself forming a lug or flat head and providing the projections or flanges 10, 10′ at opposite sides of the short slot or opening 11 which at one end thereof opens upon one lateral edge of said head.

It will thus be seen that the parts 8, 10 and 9, 10′ provide spaced pairs of confronting flanges, resulting in the formation of grooves or channels on the opposite sides of the fastener element. The connecting portions 12 of the metal strip between these confronting flanges are spaced apart for a distance which is substantially equal to the width of the slot 11, as indicated at 12′. The flanges or ribs 10 and 10′ provide spaced parts for cooperative engagement with spaced parts of the operating member or slide as will be hereinafter more fully disclosed.

Figure 4:
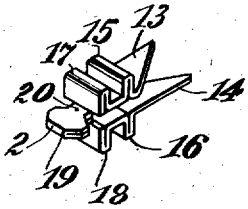
Fig. 4 is a perspective view of one of the male elements.

The male fastener element shown in Fig. 4 is also formed from a sheet metal strip having the attaching prongs 13 and 14 at its ends. This strip likewise has the folded portions 15 and 16 forming spaced projections or bases for contact with one side of the other tape 1, and the additional folded portions forming the flanges or projections 17 and 18 in spaced confronting relation to the bases 15 and 16 respectively. Thus, it will be understood that each female element likewise is thereby formed with the grooves or channels on its opposite sides.

The central portion of the metal strip from which the male element is formed is folded or doubled upon itself to provide a locking lug or head 19, said central portion of the strip being cut to produce the relatively narrow neck 20 connecting said head with the parts of the strip forming the flanges 17 and 18 respectively. These locking heads are adapted to be received through the slots or openings 11 in the female fastener elements.

Figure 2:
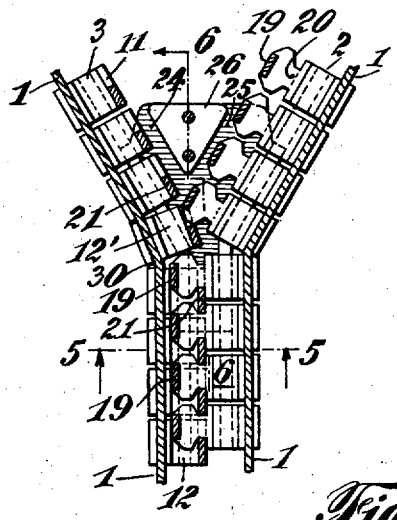
Fig. 2 is an enlarged horizontal sectional view.

As shown in Fig. 2 of the drawing, the two series of male and female elements are attached to the respective tapes 1 with the elements in each series arranged in close proximity but capable of a slight relative angular movement in the flexing of the tape when the male and female elements are in disconnected relation. This arrangement of the female elements, when said elements are in alignment with each other, results in the closure of the open ends of the slots 11 by the intermediate portion 21 of an adjacent element which constitutes the connection at the closed end of the slot therein between the flanges 10 and 10′. Thus, it will be understood that after the head 19 of a male locking element enters through the slot 11 of one female element, said element and an adjacent female element at the opposite side of the neck 20 cooperate with said locking head to prevent its withdrawal from the slot or opening. Therefore, as will be evident from Fig. 2 of the drawing, the heads 19 are closely confined between the spaced portions 12 of the adjacent female elements, and a very close interfitting or interlocking relation of the elements in the two series is obtained.

Figure 7:
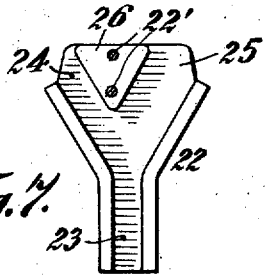
Fig. 7 is a plan view of a part of the operating member for connecting and disconnecting the interlocking elements.

The operating slide for moving the opposing elements into and out of interlocking relation preferably consists of two similar sheet metal parts, one of which is illustrated in Fig. 7 of the drawing. As shown, each of these parts, indicated by the numeral 22, has an end portion thereof of uniform width, while the other end portion is of gradually widening or triangular shaped form, the opposite side edges of both of said portions of the part 22 being flanged as more clearly shown in Fig. 5 of the drawing and thus providing the channel 23 and diverging branch channels 24, 25 which are formed between said flanges and the spacing member 26, disposed between the two parts of the slide and rigidly secured in connected relation with said parts by the rivets or pins indicated at 22′. One part of the slide member is also provided at its wider end with a projection 27 to which the bar 28 of a handle 29 is swiveled. This handle provides convenient means for the purpose of operating said slide member in either direction relative to the two series of fastening elements.

The confronting portions or flanges 8, 10 and 9, 10′ of the female elements and the corresponding confronting portions 15, 17 and 16, 18 of the male elements form grooves in which the opposing flanges on the parts of the operating member are slidably engaged.

From the above, it will be understood from reference to Fig. 2 of the drawing, that in closing the fastener or interlocking the two series of fastening elements, the operating slide is moved upwardly, and as the flanges of said locking elements move from the diverging channel branches 24, 25 into the channel 23 of said slide, the heads 19 of the male locking elements are successively caused to pass through the slots 11 of the female elements, such interlocking action being effected, while the adjacent slotted female elements are disposed at an angle to each other, as indicated at 30 in Fig. 2 of the drawing. In the continued movement of the operating slide, and when the flanges of the fastening elements are engaged in the straight channel portion 23 thereof, said adjacent female elements are brought into alignment with each other at opposite sides of the neck 20 of a male fastening element, thus effectively closing the open end of the slot 11 in one of said elements and together cooperating with the head 19 to prevent its withdrawal through said slot. It will be evident that when the movement of the operating slide is reversed, a reverse action occurs and the opposing elements in the two series are successively disconnected from each other.

From reference to Fig. 5 of the drawing, it will be noted that the parts 22 of the slidable operating member are wholly positioned between the surfaces of the overlapping flexible tapes or the edges of the material 4 and 5 to which such tapes may be secured. Therefore, when the fastener is closed, the interlocked fastening elements together with the slide and its operating handle 29 will be entirely concealed so that practically none of the metal parts will be visible. It will furter be noted that when the fastener is closed, the flanges or projections 10 and 10′ of the female fastening elements are in closely contacting engagement with the opposed flanges 17 and 18 of the male fastener elements, and since the elements of one series are in staggered relation to those of the other series, a substantially air and dust-tight closure is effected.

Having thus described a preferred form of my invention, it will nevertheless be understood that the same is not to be limited to details of form or specific arrangement of the several elements herein described, since the device is obviously susceptible of embodiment in various other alternative structures, and may be otherwise applied and used for a great variety of different purposes. Accordingly, I reserve the privilege of resorting to all such legitimate changes therein, as may be fairly incorporated within the spirit and scope of the appended claims.

I claim:

1. In a fastening device for flexible material, two series of interlocking elements, means for attaching the series of elements to opposing side faces of overlapping edge portions of the material, the opposing elements in said series projecting at an angle to the plane of the material and having coacting releasably interlocking means, an operating slider, spaced projections on each element in each series, and parts on said slider directly coacting with said projections to cause the opposed elements in the two series to successively interlock when said slider is moved in one direction.

2. In a fastening device for flexible material, two series of interlocking elements, means for attaching the series of elements to opposing side faces of overlapping edge portions of the material, the opposing elements in said series projecting at an angle to the plane of the material and having coacting releasably interlocking means, an operating slider, and parts on each element in each series forming opposed transverse flanges directly engaged by said slider to successively interlock the elements of the two series and dispose the opposing flanges thereof in contacting engagement when said slider is moved in one direction.

3. A fastening device comprising two series of interlocking elements, a strip of flexible material for each series of elements, each element in each series having a base provided with means for attaching said base to one side face of the flexible strip, whereby said element projects at an angle to the plane of the strip, and a member having means slidably coacting with parts of the elements in each series to interlock and disconnect said two series of elements and together with said elements lying substantially wholly between said flexible strips when the fastening device is closed.

4. A fastening device comprising two series of interlocking elements, one series of said elements being provided with locking heads, and the other series being provided with openings through which said heads may pass, said elements also being each provided with transverse flanges forming substantially continuous ribs and with bases spaced from said ribs to form grooves, flexible tapes on one side face of each of which the bases of said series of elements are respectively mounted said elements projecting at an angle from the respective tapes, and a flanged slidable member adapted to operate in said grooves of the two series of elements and located between said tapes, said member being operable to interlock and disconnect the two series of elements.

5. A fastening device comprising two series of interlocking elements, one series of said elements being provided with locking heads and the other series being provided with openings through which said heads may pass, flexible tapes on one side face of each of which said series of elements are respectively mounted so as to extend at an angle therefrom, and a slidable member engaging said elements and located substantially wholly between the adjacent surfaces of said tapes and operable to interlock the series of elements with each other and to separate the same.

6. A fastening device comprising two series of interlocking elements, one series of said elements being provided with locking heads and the other series being provided with slots through which said heads may pass, withdrawal of the respective heads from said slots being obstructed by the adjacent slotted elements and allowing the entry and withdrawal of said heads only when said elements are positioned at an angle to each other, flexible tapes on one side face of each of which said series of elements are respectively mounted so as to extend at an angle therefrom, and a slidable member engaging said elements and located substantially wholly between the adjacent surfaces of said tapes and operable to cause said series of elements to interlock and to separate from each other.

7. A fastening device comprising two series of interlocking elements, each element in one series being provided with a locking head and each element in the other series having an opening through which the respective heads may pass, each element in each series also having spaced pairs of confronting flanges forming grooves, a strip of flexible material for each series of elements, corresponding flanges of the elements in each series being secured to one side face of one of said strips, and an operating member having spaced parts slidably engaged in said grooves and movable between said strips of flexible material to interlock the two series of elements or disconnect the same from each other.

8. A separable fastener comprising a pair of overlapping tapes, cooperating series of locking members secured upon opposing side faces of said tapes, each of said members having grooves on opposite sides thereof parallel to the edges of the respective tapes, and an operating slide movable between the tapes and in the grooves of the locking members.

9. An interlocking element for separable fasteners comprising a sheet metal strip bent to provide spaced parts connected by a central closely folded portion of the strip forming a locking head, and each part of the strip having other portions thereof folded to provide pairs of confronting flanges forming grooves on opposite sides of said element to receive the opposed flanges of an operating slide.

10. A separable fastener comprising a pair of overlapping attaching tapes, cooperating series of locking members on opposing side faces of said tapes, each member having a slide engaging part and an operating slide disposed between and substantially wholly concealed by said tapes directly coacting with said parts of the locking members in each series.

11. A separable fastener comprising a pair of overlapping attaching tapes, cooperating series of locking members centrally secured upon opposing side faces of said tapes, each of said members having flanges extending transversely of the tape towards its opposite edges, and an operating slide between said tapes having direct coacting engagement with said flanges on the locking members.

12. Fastening means of the kind described comprising attaching tapes, a series of spaced fastener elements attached to one side face of each tape, each element comprising a metal plate fixed at its ends to the tape and having flanges transversely projecting in relatively opposite directions from said fixed ends on one side face of the tape, cooperating interlocking lugs carried by the plates on the respective tapes between the flanges thereof, and an operating slide engaged with said flanges.

13. Fastening means of the kind described comprising attaching tapes, a series of spaced fastener elements attached to one side face of each tape, each element comprising a metal plate fixed at its ends to the tape and having flanges transversely projecting in relatively opposite directions from said fixed ends on one side face of the tape, cooperating interlocking lugs carried by the plates on the respective tapes between the flanges thereof, said lugs releasably holding the two series of fastener elements in connected relation and with the opposing flanges thereof substantially in face to face contact with each other, and an operating slide engaged with said flanges.

14. A separable fastener comprising two flexible tapes, two series of cooperable fastener elements attached respectively to opposing side faces of said tapes and projecting at an angle therefrom, and an operating member positioned between said tapes having means slidably cooperating with each series of fastener elements to connect the same with each other upon movement of said member in one direction.

In testimony that I claim the foregoing as my invention, I have signed my name hereto.

JOHN A. H. SIERS.